(12) United States Patent
Han et al.

(10) Patent No.: US 12,474,971 B2
(45) Date of Patent: Nov. 18, 2025

(54) METHOD OF CONFIGURING A CLOUD SERVER RESOURCE, ELECTRONIC DEVICE AND STORAGE MEDIUM

(71) Applicant: BEIJING BAIDU NETCOM SCIENCE TECHNOLOGY CO., LTD., Beijing (CN)

(72) Inventors: Dong Han, Beijing (CN); Minghe Qiao, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 477 days.

(21) Appl. No.: 17/984,330

(22) Filed: Nov. 10, 2022

(65) Prior Publication Data
US 2023/0074351 A1 Mar. 9, 2023

(30) Foreign Application Priority Data
Nov. 23, 2021 (CN) .......................... 202111396733.8

(51) Int. Cl.
*G06F 9/50* (2006.01)

(52) U.S. Cl.
CPC .......... *G06F 9/5077* (2013.01); *G06F 9/5072* (2013.01); *G06F 2209/5022* (2013.01); *G06F 2209/503* (2013.01)

(58) Field of Classification Search
CPC ................ G06F 9/5077; G06F 9/5072; G06F 2209/5022; G06F 2209/503; G06F 9/5027; H04L 41/0883; H04L 41/22; H04L 41/0816; H04L 41/0896; H04L 43/16; H04L 43/0817

See application file for complete search history.

(56) References Cited

U.S. PATENT DOCUMENTS

| | | |
|---|---|---|
| 2014/0258446 A1 | 9/2014 | Bursell |
| 2018/0287898 A1 | 10/2018 | Bellini, III et al. |
| 2019/0294473 A1* | 9/2019 | Martin ................ G06F 11/3495 |
| 2021/0111949 A1 | 4/2021 | Collins |

(Continued)

FOREIGN PATENT DOCUMENTS

| | | |
|---|---|---|
| CN | 102638457 | 8/2012 |
| CN | 109343965 | 2/2019 |

(Continued)

OTHER PUBLICATIONS

Office Action issued in Chinese Patent Application No. 202111396733.8, dated May 12, 2023.

(Continued)

*Primary Examiner* — Sisley N Kim
(74) *Attorney, Agent, or Firm* — Pillsbury Winthrop Shaw Pittman, LLP

(57) ABSTRACT

A method of configuring a cloud server resource, an electronic device and a storage medium, which specifically relate to a field of artificial intelligence technology, in particular to a field of cloud computing technology. A method of configuring a cloud server resource includes: obtaining an operation index of a server instance of an object; comparing the obtained operation index with a threshold; and determining whether a configuration of the cloud server resource is to be adjusted, based on a result of the comparing.

18 Claims, 3 Drawing Sheets

(56) References Cited

U.S. PATENT DOCUMENTS

| | | | | |
|---|---|---|---|---|
| 2022/0318062 A1* | 10/2022 | Parmar | ............... | G06F 9/5016 |
| 2024/0314064 A1* | 9/2024 | Jin | ............... | H04L 47/24 |
| 2024/0323125 A1* | 9/2024 | Kim | ............... | H04L 47/127 |

FOREIGN PATENT DOCUMENTS

| | | |
|---|---|---|
| CN | 109408200 | 3/2019 |
| CN | 111444015 | 7/2020 |
| CN | 112380011 | 2/2021 |
| CN | 112653563 | 4/2021 |

OTHER PUBLICATIONS

Extended European Search Report issued in European Patent Application No. 22207742.2, dated Mar. 22, 2023.

B. Zhang et al., "Research on Cluster Scheduling Based on CoreOS Oriented Load Integration", Computer Systems & Applications, 26(11), pp. 67-75 (2017).

\* cited by examiner

METHOD OF CONFIGURING A CLOUD SERVER RESOURCE, ELECTRONIC DEVICE AND STORAGE MEDIUM

This application is claims priority to Chinese Application No. 202111396733.8 filed on Nov. 23, 2021, which is incorporated herein in its entirety by reference.

TECHNICAL FIELD

The present disclosure relates to a field of artificial intelligence technology, in particular to a field of cloud computing technology. Specifically, the present disclosure relates to a method of configuring a cloud server resource, an electronic device and a storage medium.

BACKGROUND

With a gradual elimination of virtual host and a high cost of independent server, it has become a consensus to choose cloud server to deploy websites. An object may customize the configuration of the cloud server resource as desired. However, an existing cloud server usually provides a fixed configuration of the cloud server resource according to the requirements of the object. When a business requirement of an object business system changes, the resource provided by the existing cloud server may no longer be suitable. For example, when the business requirement of the object increases, the resource provided by the existing cloud server is insufficient to meet the business requirement, such that the operation of the object business system is affected. When the business requirement of the object decreases, the resource provided by the existing cloud server is partially idle, such that the usage of resource is low, wasting the usage cost of the object. Therefore, the improper configuration of the cloud server resource has become a factor affecting the experience of the object.

SUMMARY

The present disclosure provides a method of configuring a cloud server resource, an electronic device and a storage medium.

According to one aspect of the present disclosure, there is provided a method of configuring a cloud server resource, including:
  obtaining an operation index of a server instance of an object;
  comparing the obtained operation index with a threshold; and
  determining whether a configuration of the cloud server resource is to be adjusted, based on a result of the comparing.

According to another aspect of the present disclosure, there is provided an electronic device, including:
  at least one processor; and
  a memory, communicatively coupled with the at least one processor; wherein the memory stores instructions executable by the at least one processor, and the instructions, when executed by the at least one processor, cause the at least one processor to implement the method of one aspect of the present disclosure.

According to another aspect of the present disclosure, there is provided a non-transitory computer readable storage medium storing computer instructions, wherein the computer instructions are configured to cause a computer to implement the method of one aspect of the present disclosure.

It should be understood that the content described in this part is not intended to identify key or features of the embodiments of the present disclosure, nor is it intended to limit the scope of the present disclosure. Other features of the present disclosure will be readily understood by the following description.

BRIEF DESCRIPTION OF THE DRAWINGS

The accompanying drawings are used for better understanding of the solution and do not constitute a limitation of the present disclosure, in which.

DETAILED DESCRIPTION OF EMBODIMENTS

Exemplary embodiments of the present disclosure will be described below with reference to the accompanying drawings, which include various details of the embodiments of the present disclosure to facilitate understanding and should be considered as merely exemplary. Therefore, those of ordinary skilled in the art should realize that various changes and modifications may be made to the embodiments described herein without departing from the scope and spirit of the present disclosure. Likewise, for clarity and conciseness, descriptions of well-known functions and structures are omitted in the following description.

Figure 1:
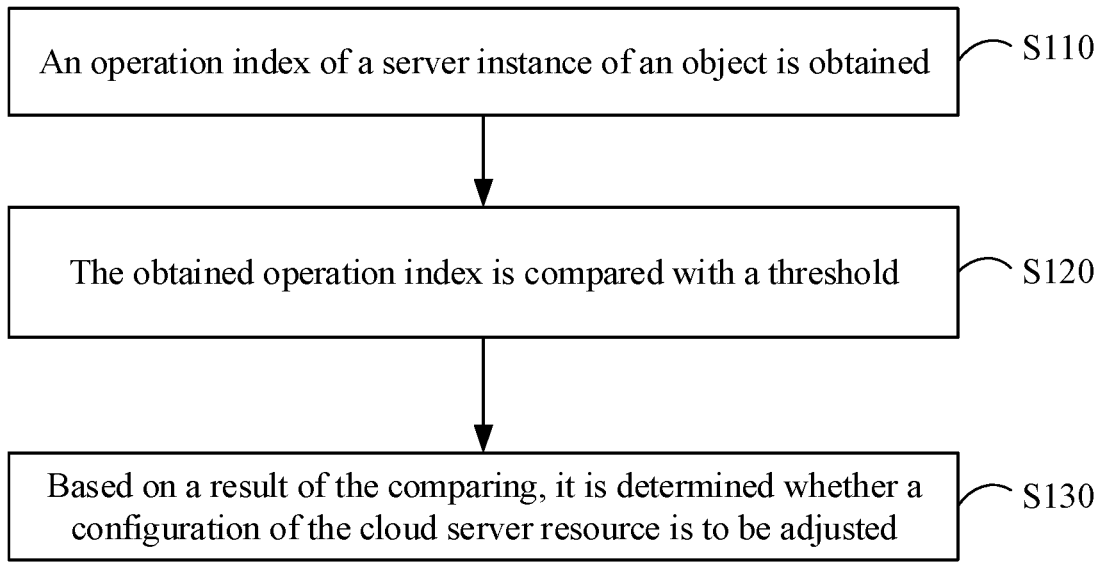
FIG. 1 is a flowchart of a method of configuring a cloud server resource according to an embodiment of the present disclosure.

FIG. 1 is a flowchart of a method 100 of configuring a cloud server resource according to an embodiment of the present disclosure.

At step S110, an operation index of a server instance of an object is obtained.

In some embodiments, an object may have a plurality of server instances. The server instance is a virtual computing environment (in other words, a virtual machine), including a CPU, a memory, an operating system, a bandwidth, a disk, and other computing components.

The operation index is an index indicating the utilization of a corresponding computing component in the server instance. For example, the operation index may be at least one of a CPU usage, a memory usage, or a disk usage.

In addition, for a plurality of objects, the resource utilization of the business system may be different in different time periods. The time periods may be time periods within a day, or may be time periods within a certain time duration (for example, one year or several months). For example, a resource usage of a takeout platform is low in a non-dining period of a day, and is high in a dining period of a day. A video on demand platform has a low resource usage in the daytime, while at night, for example, after 20:00, the resource usage of video on demand platform increases significantly. During a large-scale promotion period in a year, the resource usage of an e-commerce platform will surge.

Therefore, when obtaining the operation index of the server instance of the object, at least one operation index for at least one time period may be obtained for each of the plurality of server instances. For example, for the takeout platform, the CPU usage, the memory usage and the disk usage of each server instance during the non-dining time period such as 9:00-10:00 are obtained, and the CPU usage, the memory usage and the disk usage of the server instance during the dining time period such as 11:30-13:00 are obtained. In this way, the operation indexes of the plurality of server instances during different time periods may be obtained more accurately.

At step S120, the obtained operation index is compared with a threshold.

In some embodiments, the threshold may include a first threshold or a second threshold, or include both the first threshold and the second threshold. The first threshold corresponds to a peak value of usage. The second threshold corresponds to a valley value of usage.

The threshold may be set by the cloud server provider according to the experiences, or it may be customized by the object according to the object's business requirements. Alternatively, if the cloud server provider does not set a threshold and the object does not customize a threshold, a default threshold is employed.

When setting the threshold according to the experiences, the cloud server provider may set an initial threshold, and then a minimum value of a full cost function may be obtained through a machine learning algorithm, such as a gradient descent method, a Newton method, a Lagrange multiplier method, etc., according to the occupancy of the cloud server resource during each time period, so as to obtain an optimized threshold.

In the resource configuration options provided by the cloud server provider to the object, different evaluation values may be generated for resource configuration. Therefore, the object may customize thresholds according to the sensitivities of the business system of the object to different operation indexes. That is, the object may customize a threshold based on his/her business requirements and an evaluation value of a corresponding resource configuration.

In addition, for the plurality of objects, the resource utilization of the business system may vary in different time periods, and there may be a plurality of operation indexes indicating the resource utilization. Therefore, a corresponding threshold of at least one time period may be set for each operation index. That is, at least one threshold for at least one time period may be obtained.

Accordingly, before comparing the obtained operation index with the threshold, at least one operation index for at least one time period is obtained for each of the plurality of server instances. Then, for each of the plurality of server instances, the obtained operation index is compared with respective one of the at least one threshold according to the time period.

For example, for the takeout platform, the CPU usage in the non-dining period, such as 9:00-10:00 and the CPU usage in the dining period, such as 11:30-13:00, may be obtained. For each of the two time periods, corresponding thresholds have been set. For example, a first threshold and a second threshold for the non-dining period are $th_{f1}$ and $th_{f2}$ respectively, while a first threshold and a second threshold for the dining period are $th_{b1}$ and $th_{b2}$ respectively. The obtained CPU usage of the non-dining period is compared with the first threshold $th_{f1}$ and the second threshold $th_{f2}$ respectively to determine whether the resource allocated to the takeout platform for the time period is sufficient or idle. Similarly, the obtained CPU usage in the dining period is compared with the first threshold $th_{b1}$ and the second threshold $th_{b2}$ respectively to determine whether the resource allocated to the takeout platform for the time period is sufficient or idle.

It should be understood that the above embodiment of obtaining the CPU usage of the plurality of time periods is only an example, and it is also possible to obtain a plurality of operation indexes of a server instance, which include, for example, one or more of the memory usage and the disk usage. When comparing the obtained operation index with the threshold, an operation index of the server instance in a certain period may be compared with a corresponding threshold separately to obtain a separate comparison result between each operation index and a threshold. It is also possible to compare a set of operation indexes of the server instance in a certain period with a corresponding set of thresholds, to obtain a combination comparison result between the operation indexes and the thresholds.

At step S130, it is determined whether a configuration of the cloud server resource is to be adjusted, based on a result of the comparing.

In some embodiments, it is determined whether the configuration of the cloud server resource is to be adjusted, based on the comparison between the operation index of each server instance and a corresponding threshold. For example, when the operation index exceeds the first threshold corresponding to the peak value of the usage, it is considered that the currently allocated cloud server resource is insufficient to meet the business requirements of the object, and it is suggested to increase the resource configuration. When the operation index is lower than the second threshold corresponding to the valley value of the usage, it is considered that a part of the currently allocated cloud server resource is idle, and a waste of the resource configuration for the object occurs. Therefore, it may be suggested to decrease the resource configuration.

It should be understood that the threshold may include only one of the first threshold and the second threshold in consideration of computational complexity. In other words, the above comparison between the operation index and the threshold may include a comparison between the operation index and the first threshold, or a comparison between the operation index and the second threshold, depending on the object's expectation of the allocated resource. For example, if the object requires that the allocated resource must be sufficient to support the operation of his/her business system, only the first threshold is set, so as to determine whether the allocated resource is sufficient to meet the requirements of the business system under the full load operation. In addition, if the object intends to save costs as much as possible, it is possible to set only the second threshold, so as to determine whether the allocated resource is idle.

Alternatively, when it is desired to provide complete adjustment options to the object, the threshold may include both the first threshold and the second threshold, in order to provide a comparison result of the operation index with respect to the two thresholds.

By comparing the operation index of the server instance of the object with the threshold, the resource usage of the server instance of the object may be determined, and then it may be determined whether the configuration of the cloud server resource is to be adjusted, in order to provide a more reasonable resource configuration option to the object. This avoids a decline of user experience caused by the insufficient resource, and a waste caused by the idle resource.

Figure 2:
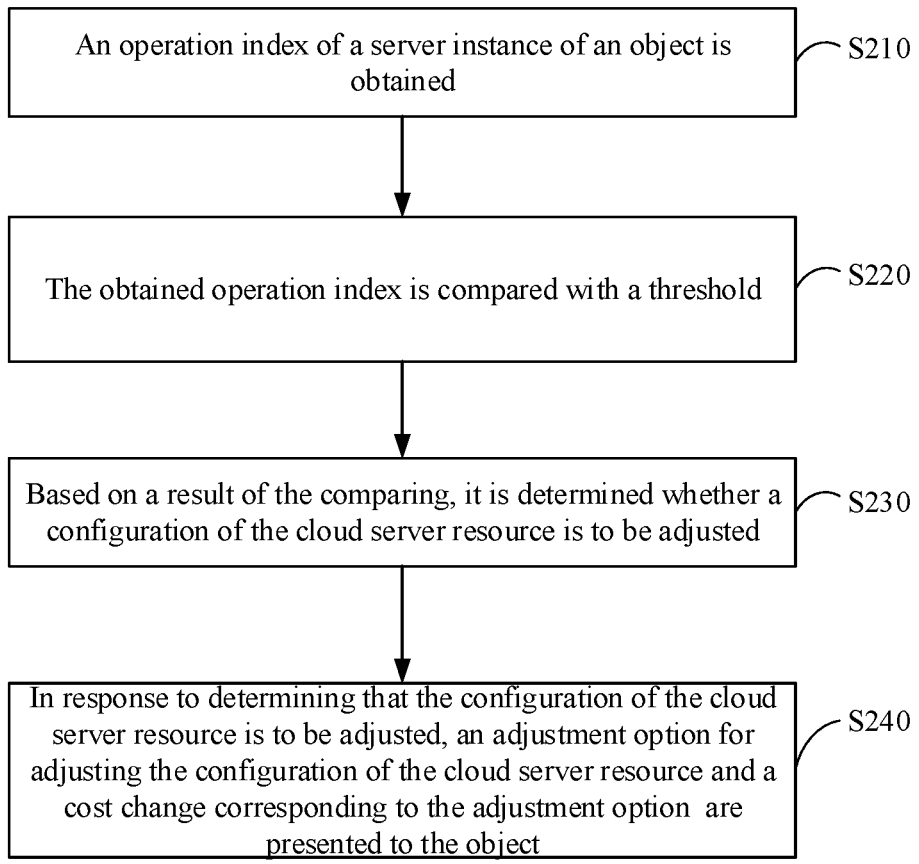
FIG. 2 is a flowchart of a method of configuring a cloud server resource according to another embodiment of the present disclosure.

FIG. 2 is a flowchart of a method 200 of configuring a cloud server resource according to another embodiment of the present disclosure.

In FIG. 2, steps S210 to S230 respectively correspond to steps S110 to S130 in the method 100. In addition, after step S230, step S240 may be further included. In step S240, in response to determining that the configuration of the cloud server resource is to be adjusted, an adjustment option for adjusting the configuration of the cloud server resource and a cost change corresponding to the adjustment option are presented to the object.

In some embodiments, when determining whether to adjust the configuration of the cloud server resource based on the comparison result at step S230, it is determined that the configuration of the cloud server resource is to be adjusted, if the operation index exceeds the first threshold and/or the operation index is lower than the second threshold. Then, the adjustment option for adjusting the configuration of the cloud server resource and the cost change corresponding to the adjustment option are presented to the object.

Further, when the operation index exceeds the first threshold, the configuration of the cloud server resource needs to be increased. A set of adjustment options is presented to the object, to indicate the configuration of the cloud server resource that may be increased. The set of adjustment options may include adjustment option 1, adjustment option 2, . . . , and adjustment option n. The adjustment options have respective effects on improving the performance of the object business system, and thus may generate different costs. Therefore, it is also desired to present to the object a cost change corresponding to each adjustment option in the set of adjustment options. Similarly, when the operation index is lower than the second threshold, the configuration of the cloud server resource may be decreased. In this case, a set of adjustment options is presented to the object to indicate the configuration of the cloud server resource that may be decreased.

As mentioned above, the operation index may include at least one operation index for at least one time period. Accordingly, the adjustment options may also include an independent adjustment option for independently adjusting one or more of the operation indexes, or a combination adjustment option for adjusting two or more of the operation indexes in association with each other.

For example, when comparing the obtained operation indexes with the thresholds, an operation index of the server instance in a certain period may be compared with a corresponding threshold separately to obtain an independent comparison result between each operation index and a respective threshold. Accordingly, the adjustment option is the independent adjustment option, which is used to independently adjust one or more of the operation indexes. For example, for a CPU usage exceeding the corresponding first threshold, the adjustment option may include an option of increasing the number of the cores of the CPU. For a memory usage between the first threshold and the second threshold, which does not need to be adjusted, the adjustment option may be presented as empty, for example, presented in the form of "–". For a disk usage lower than the second threshold, the adjustment option may include an option of decreasing the disk capacity.

Further, a set of operation indexes of the server instance in a certain period may be compared with a corresponding set of thresholds to obtain a combination comparison result between the operation indexes and the thresholds. Accordingly, the adjustment option is a combination adjustment option, which is used to adjust two or more of the operation indexes in association with each other. According to the sensitivities of the object business system to two or more of the operation indexes, the operation indexes may be allocated with corresponding weights, and are weighted to obtain a combination adjustment option finally. For example, transactional business systems, such as takeout platforms and e-commerce platforms, have a high requirement of CPU, so a high weight is allocated to the CPU usage among the operation indexes and relatively low weights are allocated to other operation indexes. Analytical business systems, such as data warehouses, have a high requirement of memory, so that a high weight is allocated to the memory usage among the operation indexes and relatively low weights are allocated to other operation indexes. For the first threshold, the combination comparison result may be calculated, for example, according to the following equation:

$$CCR_1 = w_C \times \frac{U_C}{th_{C1}} + w_M \times \frac{U_M}{th_{M1}} + w_D \times \frac{U_D}{th_{D1}}$$

where $CCR_1$ represents a combination comparison result for the first threshold, $w_C$, $w_M$ and $w_D$ represent a weight allocated to the CPU usage, a weight allocated to the memory usage and a weight allocated to the disk usage respectively, $U_C$, $U_M$ and $U_D$ represent the CPU usage, the memory usage and the disk usage respectively, and $th_{C1}$, $th_{M1}$ and $th_{D1}$ represent a first threshold for the CPU usage, a first threshold for the memory usage and a first threshold for the disk usage respectively.

Similarly, for the second threshold, the combination comparison result may be calculated, for example, according to the following equation:

$$CCR_2 = w_C \times \frac{U_C}{th_{C2}} + w_M \times \frac{U_M}{th_{M2}} + w_D \times \frac{U_D}{th_{D2}}$$

where $CCR_2$ represents a combination comparison result for the second threshold, $w_C$, $w_M$ and $w_D$ represent a weight allocated to the CPU usage, a weight allocated the memory usage and a weight allocated the disk usage respectively, $U_C$, $U_M$ and $U_D$ represent the CPU usage, the memory usage and the disk usage respectively, and $th_{C2}$, $th_{M2}$ and $th_{D2}$ represent a second threshold for the CPU usage, a second threshold for the memory usage and a second threshold for the disk usage respectively.

It should be understood that the three operation indexes are weighted in the above two equations. It is also possible to weight one or two of the three operation indexes, or weight more than three operation indexes.

By presenting to the object the adjustment option for adjusting the configuration of the cloud server resource and the cost change corresponding to the adjustment option in response to determining that the configuration of the cloud server resource is to be adjusted, it is possible to let the object know his/her resource utilization and have an intuitive concept for further optimizing his/her resource configuration. Based on the presented adjustment option and the cost change corresponding to the adjustment option, the object may select the appropriate adjustment option according to his/her business requirements.

Figure 3:
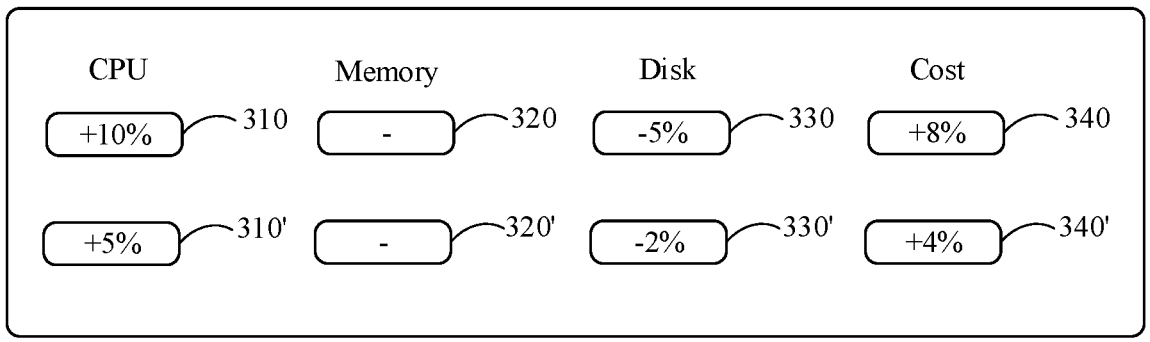
FIG. 3 is a schematic diagram showing an adjustment option for adjusting the configuration of the cloud server resource and a cost change corresponding to the adjustment option presented to an object according to an embodiment of the present disclosure.

FIG. 3 is a schematic diagram 300 showing an adjustment option for adjusting the configuration of the cloud server resource and a cost change corresponding to the adjustment option presented to an object according to an embodiment of the present disclosure.

As shown in FIG. 3, when the CPU usage exceeds the corresponding first threshold, the adjustment option 310 corresponding to the CPU usage may be presented as "+10%", which indicates increasing the number of the cores of the CPU by 10%. When the memory usage is between the first threshold and the second threshold, the memory usage does not need to be adjusted, and the adjustment option 320 corresponding to the memory usage may be presented as "–". When the disk usage is lower than the second threshold, the adjustment option 330 corresponding to the disk usage may be presented as "–5%", which indicates decreasing the disk capacity by 5%. The corresponding cost change 340 may be presented as "+8%".

The above adjustment options 310, 320 and 330 may be calculated based on a ratio of the operation index to the corresponding threshold. For example, when $U_C/th_{C_1}=1.1$, the adjustment option 310 may be presented as "+10%", wherein $U_C$ is the CPU usage and $th_{C_1}$ is the first threshold of the CPU usage.

In addition, a set of adjustment options may be provided to the object, and the set of adjustment options may include adjustment option 1, adjustment option 2, . . . , and adjustment option n. For example, adjustment option 1 is a combination of the above "+10%, –, –5%, +8%". For adjustment option 2, for example, considering the overall cost, adjustment option 310' may be presented as "+5%", adjustment option 320' may be presented as "–", adjustment option 330' may be presented as "–2%", and the cost change 340' in this case may be presented as "+4%", although $U_C/th_{C_1}=1.1$.

It should be understood that when the combination adjustment option is used to adjust two or more of the operation indexes in association with each other, it is possible to present only the final combination adjustment option and the cost change corresponding to the final combination adjustment option.

Figure 4:
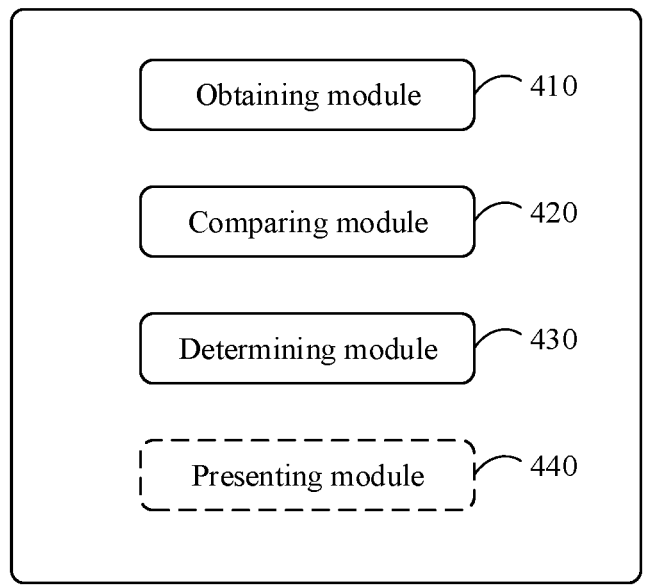
FIG. 4 is a schematic diagram of an apparatus of configuring a cloud server resource according to an embodiment of the present disclosure.

FIG. 4 is a schematic diagram of an apparatus 400 of configuring a cloud server resource according to an embodiment of the present disclosure.

As shown in FIG. 4, the apparatus 400 of configuring a cloud server resource includes an obtaining module 410, a comparing module 420, and a determining module 430.

The obtaining module 410 is configured to obtain an operation index of a server instance of an object.

In some embodiments, an object may have a plurality of server instances. A server instance is a virtual computing environment (in other words, a virtual machine), including a CPU, a memory, an operating system, a bandwidth, a disk, and other computing components.

The operation index is an index indicating the utilization of a corresponding computing component in the server instance. For example, the operation index may be at least one of a CPU usage, a memory usage, and a disk usage.

In addition, for a plurality of objects, the resource utilization of the business system may be different in different time periods. The time periods may be time periods within a day, or may be time periods within a certain time duration (for example, one year or several months). For example, a resource usage of a takeout platform is low in a non-dining period of a day, and is high in a dining period of a day. A video on demand platform has a low resource usage in the daytime, while at night, for example, after 20:00, the resource usage of video on demand platform increases significantly. During a large-scale promotion period in a year, the resource usage of an e-commerce platform will surge.

Therefore, the obtaining module 410 may further include an obtaining unit, which may obtain, for each of the plurality of server instances, at least one operation index for at least one time period. For example, for the takeout platform, the CPU usage, the memory usage and the disk usage of each server instance during the non-dining time period such as 9:00-10:00 are obtained, and the CPU usage, the memory usage and the disk usage of the server instance during the dining time period such as 11:30-13:00 are obtained. In this way, the operation indexes of the plurality of server instances during different time periods may be obtained more accurately.

The comparing module 420 is configured to compare the obtained operation index with a threshold.

In some embodiments, the threshold may include a first threshold or a second threshold, or include both the first threshold and the second threshold. The first threshold corresponds to a peak value of usage. The second threshold corresponds to a valley value of usage.

The threshold may be set by the cloud server provider according to experiences, or it may be customized by the object according to the object's business requirements. Alternatively, if the cloud server provider does not set a threshold and the object does not customize a threshold, a default threshold is employed.

When setting the threshold according to the experiences, the cloud server provider may set an initial threshold, and then a minimum value of a full cost function may be obtained through a machine learning algorithm, such as a gradient descent method, a Newton method, a Lagrange multiplier method, etc., according to the occupancy of the cloud server resource during each time period, so as to obtain an optimized threshold.

In the resource configuration options provided by the cloud server provider to the object, different evaluation values may be generated for resource configuration. Therefore, the object may customize thresholds according to the sensitivities of the business system of the object to different operation indexes. That is, the object may customize a threshold based on his/her business requirements and an evaluation value of the corresponding resource configuration.

In addition, for the plurality of objects, the resource utilization of the business system may vary in different time periods may be different, and there may be a plurality of operation indexes indicating the resource utilization. Therefore, the corresponding threshold of at least one time period may be set for each operation index. That is, at least one threshold for at least one time period may be obtained.

Accordingly, the comparing module 420 may include a comparison unit. Before comparing the obtained operation index with the threshold, at least one operation index for at least one time period is obtained for each of the plurality of server instances. Then, for each of the plurality of server instances, the obtained operation index is compared with respective one of the at least one threshold according to the time period.

For example, for the takeout platform, the CPU usage in the non-dining period, such as 9:00-10:00 and the CPU usage in the dining period, such as 11:30-13:00, may be obtained. For each of the two time periods, corresponding thresholds have been set. For example, a first threshold and a second threshold for the non-dining period are $th_{f1}$ and $th_{f2}$ respectively, while the first threshold and the second threshold for the dining period are $th_{b1}$ and $th_{b2}$ respectively. The obtained CPU usage of the non-dining period is compared with the first threshold $th_{f1}$ and the second threshold $th_{f2}$ respectively to determine whether the resource allocated to the takeout platform for the time period is sufficient or idle. Similarly, the obtained CPU usage during the dining period is respectively compared with the first threshold $th_{b1}$ and the second threshold $th_{b2}$ to determine whether the resource allocated to the takeout platform for the time period is sufficient or idle.

It should be understood that the above embodiment of obtaining the CPU usage of the plurality of time periods is only an example, and it is also possible to obtain a plurality of operation indexes of a server instance, which include, for example, one or more of the memory usage and the disk usage. When comparing the obtained operation index with the threshold, an operation index of the server instance in a certain period may be compared with a corresponding threshold separately to obtain a separate comparison result of each operation index and a threshold. It is also possible to compare a set of operation indexes of the server instance in a certain period with a corresponding set of thresholds, to obtain a combination comparison result between the operation indexes and the thresholds.

The determining module 430 is configured to determine whether the configuration of the cloud server resource is to be adjusted, based on a comparison result.

In some embodiments, it is determined whether the configuration of the cloud server resource is to be adjusted, based on the comparison between the operation index of each server instance and a corresponding threshold. For example, when the operation index exceeds the first threshold corresponding to the peak value of the usage, it is considered that the currently allocated cloud server resource is insufficient to meet the business requirements of the object, and it is suggested to increase the resource configuration. When the operation index is lower than the second threshold corresponding to the valley value of the usage, it is considered that a part of the currently allocated cloud server resource is idle, and a waste of the resource configuration for the object occurs. Therefore, it may be suggested to decrease the resource configuration.

It should be understood that the threshold may include only one of the first threshold and the second threshold in consideration of computational complexity. In other words, the above comparison between the operation index and the threshold may include a comparison between the operation index and the first threshold, or a comparison between the operation index and the second threshold, depending on the object's expectation of the allocated resource. For example, if the object requires that the allocated resource must be sufficient to support the operation of his/her business system, only the first threshold is set, so as to determine whether the allocated resource is sufficient to meet the requirements of the business system under the full load operation. In addition, if the object intends to save costs as much as possible, it is possible to set only the second threshold, so as to determine whether the allocated resource is idle.

Alternatively, when it is desired to provide the complete adjustment options to the object, the threshold may include both the first threshold and the second threshold, in order to provide a comparison result of the operation index with respect to the two thresholds.

By comparing the operation index of the server instance of the object with the threshold, the resource usage of the server instance of the object may be determined, and then it may be determined whether the configuration of the cloud server resource is to be adjusted, in order to provide a more reasonable resource configuration option to the object. This avoids a decline of user experience caused by the insufficient resource, and a waste caused by the idle resource.

Further, the apparatus 400 of configuring a cloud server resource may further include a presenting module 440 (shown in dotted lines in the figure), which is configured to present an adjustment option for adjusting the configuration of cloud server resource and a cost change corresponding to the adjustment option to the object, in response to the determining module 430 determining that the configuration of the cloud server resource is to be adjusted.

In some embodiments, when determining whether to adjust the configuration of the cloud server resource based on the comparison result, it is determined that the configuration of the cloud server resource is to be adjusted if the operation index exceeds the first threshold and/or the operation index is lower than the second threshold. Then, the adjustment option for adjusting the configuration of the cloud server resource and the cost change corresponding to the adjustment option are presented to the object.

Further, when the operation index exceeds the first threshold, the configuration of the cloud server resource needs to be increased. A set of adjustment options is presented to the object, to indicate the configuration of the cloud server resource that may be increased. The set of adjustment options include adjustment option 1, adjustment option 2, . . . , and adjustment option n. The adjustment options have respective effects on improving the performance of the object business system, and thus may generate different costs. Therefore, it is also desired to present to the object the cost change corresponding to each adjustment option in the set of adjustment options. Similarly, when the operation index is lower than the second threshold, the configuration of the cloud server resource may be decreased. In this case, a set of adjustment options is presented to the object to indicate the configuration of the cloud server resource that may be decreased.

As mentioned above, the operation index may include at least one operation index for at least one time period. Accordingly, the adjustment option may also include an independent adjustment option for independently adjusting one or more of the operation indexes, or a combination adjustment option for adjusting two or more of the operation indexes in association with each other.

For example, when comparing the obtained operation indexes with the thresholds, an operation index of the server instances in a certain period may be compared with a corresponding threshold separately to obtain an independent comparison result between each operation index and a respective threshold. Accordingly, the adjustment option is the independent adjustment option, which is used to independently adjust one or more of the operation indexes. For example, for a CPU usage exceeding the corresponding first threshold, the adjustment option may include an option of increasing the number of the cores of the CPU. For a memory usage between the first threshold and the second threshold, which does not need to be adjusted, the adjustment option may be presented as empty, for example, presented in the form of "–". If the disk usage is lower than the second threshold, the adjustment option may include decreasing a disk capacity.

Further, a set of operation indexes of the server instance in a certain period may be compared with a corresponding set of thresholds to obtain a combination comparison result between the operation indexes and the thresholds. Accordingly, the adjustment option is a combination adjustment option, which is used to adjust two or more of the operation indexes in association with each other. According to the sensitivities of the object business system to two or more of the operation indexes, the operation indexes may be allocated with corresponding weights, and are weighted to obtain a combination adjustment option finally. For example, transactional business systems, such as takeout platforms and e-commerce platforms, have a high requirement of CPU, so a high weight is allocated to the CPU usage among the operation indexes and relatively low weights are allocated to other operation indexes. Analytical business systems, such as data warehouses, have a high requirement of memory, so a high weight is allocated to the memory usage among the operation indexes and relatively low weights are allocated to other operation indexes. For the first threshold, the combination comparison result may be calculated, for example, according to the following equation:

$$CCR_1 = w_C \times \frac{U_C}{th_{C1}} + w_M \times \frac{U_M}{th_{M1}} + w_D \times \frac{U_D}{th_{D1}}$$

where $CCR_1$ represents a combination comparison result for the first threshold, $w_C$, $w_M$ and $w_D$ represent a weight allocated to the CPU usage, the a weight allocated to memory usage and a weight allocated to the disk usage respectively, $U_C$, $U_M$ and $U_D$ represent the CPU usage, the memory usage and the disk usage respectively, and $th_{C1}$, $th_{M1}$ and $th_{D1}$ represent a first threshold for the CPU usage, a first threshold for the memory usage and a first threshold for the disk usage respectively.

Similarly, for the second threshold, the combination comparison result may be calculated, for example, according to the following equation:

$$CCR_2 = w_C \times \frac{U_C}{th_{C2}} + w_M \times \frac{U_M}{th_{M2}} + w_D \times \frac{U_D}{th_{D2}}$$

where $CCR_2$ represents a combination comparison result for the second threshold, $w_C$, $w_M$ and $w_D$ represent a weight allocated to the CPU usage, a weight allocated to the memory usage and a weight allocated to the disk usage respectively, $U_C$, $U_M$ and $U_D$ represent the CPU usage, the memory usage and the disk usage respectively, and $th_{C2}$, $th_{M2}$ and $th_{D2}$ represent a second threshold for the CPU usage, a second threshold for the memory usage and a second threshold for the disk usage respectively.

It should be understood that the three operation indexes are weighted in the above two equations. It is also possible to weight one or two of the three operation indexes, or weight more than three operation indexes.

By presenting to the object the adjustment option for adjusting the configuration of the cloud server resource and the cost change corresponding to the adjustment option in response to determining that the configuration of the cloud server resource is to be adjusted, it is possible to let the object know his/her resource utilization and have an intuitive concept for further optimizing his/her resource configuration. Based on the presented adjustment option and the cost change corresponding to the adjustment option, the object may select the appropriate adjustment option according to his/her business requirements.

Collecting, storing, using, processing, transmitting, providing, and disclosing etc. of the personal information of the user involved in the present disclosure all comply with the relevant laws and regulations, are protected by essential security measures, and do not violate the public order and morals. According to the present disclosure, personal information of the user is acquired or collected after such acquirement or collection is authorized or permitted by the user.

Figure 5:
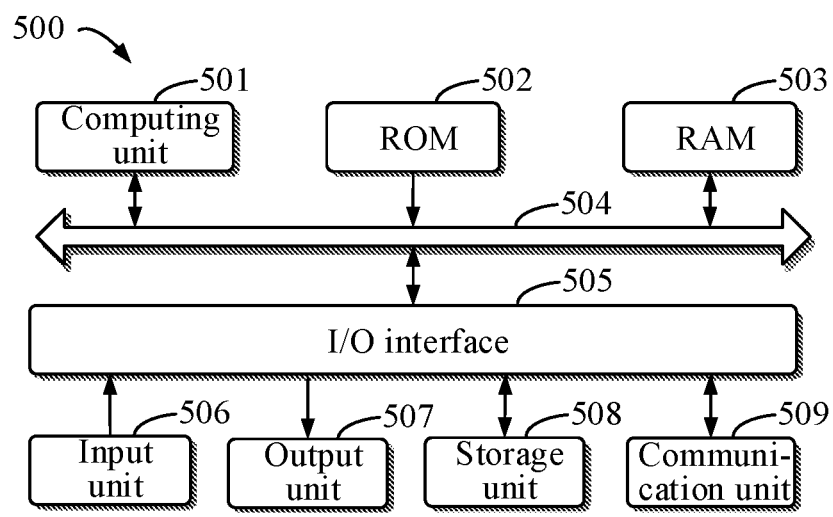
FIG. 5 shows a schematic block diagram of an electronic device that may be used to implement an exemplary embodiment of the present disclosure.

FIG. 5 shows a schematic block diagram of an electronic device 500 that may be used to implement an exemplary embodiment of the present disclosure. The electronic device is intended to represent various forms of digital computers, such as a laptop computer, a desktop computer, a workstation, a personal digital assistant, a server, a blade server, a mainframe computer, and other suitable computers. The electronic device may further represent various forms of mobile devices, such as a personal digital assistant, a cellular phone, a smart phone, a wearable device, and other similar computing devices. The components as illustrated herein, and connections, relationships, and functions thereof are merely examples, and are not intended to limit the implementation of the present disclosure described and/or required herein.

As shown in FIG. 5, the electronic device 500 may include computing unit 501, which may perform various appropriate actions and processing based on a computer program stored in a read-only memory (ROM) 502 or a computer program loaded from a storage unit 508 into a random access memory (RAM) 503. Various programs and data required for the operation of the electronic device 500 may be stored in the RAM 503. The computing unit 501, the ROM 502 and the RAM 503 are connected to each other through a bus 504. An input/output (I/O) interface 505 is further connected to the bus 504.

Various components in the electronic device 500 are connected with I/O interface 505, including an input unit 506, such as a keyboard, a mouse, etc.; an output unit 507, such as various types of displays, speakers, etc.; a storage unit 508, such as a magnetic disk, an optical disk, etc.; and a communication unit 509, such as a network card, a modem, a wireless communication transceiver, etc. The communication unit 509 allows the electronic device 500 to exchange information/data with other devices through a computer network such as the Internet and/or various telecommunication networks.

The computing unit 501 may be various general-purpose and/or special-purpose processing components with processing and computing capabilities. Some examples of the computing unit 501 include but are not limited to a central processing unit (CPU), a graphics processing unit (GPU), various dedicated artificial intelligence (AI) computing chips, various computing units running machine learning model algorithms, a digital signal processor (DSP), and any appropriate processor, controller, microcontroller, and so on. The computing unit 501 may perform the various methods and processes described above, such as the method 100 or 200. For example, in some embodiments, the method described above may be implemented as a computer software program that is tangibly contained on a machine-readable medium, such as a storage unit 508. In some embodiments, part or all of a computer program may be loaded and/or installed on the electronic device 500 via the ROM 502 and/or the communication unit 509. When the computer program is loaded into the RAM 503 and executed by the computing unit 501, one or more steps of the method described above may be performed. Alternatively, in other embodiments, the computing unit 501 may be configured to perform the method in any other appropriate way (for example, by means of firmware).

Various embodiments of the systems and technologies described herein may be implemented in a digital electronic circuit system, an integrated circuit system, a field programmable gate array (FPGA), an application specific integrated circuit (ASIC), an application specific standard product (ASSP), a system on chip (SOC), a complex programmable logic device (CPLD), a computer hardware, firmware, software, and/or combinations thereof. These various embodiments may be implemented by one or more computer programs executable and/or interpretable on a programmable system including at least one programmable processor. The programmable processor may be a dedicated or general-purpose programmable processor, which may receive data and instructions from the storage system, the at least one input device and the at least one output device, and may transmit the data and instructions to the storage system, the at least one input device, and the at least one output device.

Program codes for implementing the method of the present disclosure may be written in any combination of one or more programming languages. These program codes may be provided to a processor or a controller of a general-purpose computer, a special-purpose computer, or other programmable data processing devices, so that when the program codes are executed by the processor or the controller, the functions/operations specified in the flowchart and/or block diagram may be implemented. The program codes may be executed completely on the machine, partly on the machine, partly on the machine and partly on the remote machine as an independent software package, or completely on the remote machine or the server.

In the context of the present disclosure, the machine readable medium may be a tangible medium that may contain or store programs for use by or in combination with an instruction execution system, device or apparatus. The machine readable medium may be a machine-readable signal medium or a machine-readable storage medium. The machine readable medium may include, but not be limited to, electronic, magnetic, optical, electromagnetic, infrared or semiconductor systems, devices or apparatuses, or any suitable combination of the above. More specific examples of the machine readable storage medium may include electrical connections based on one or more wires, portable computer disks, hard disks, random access memory (RAM), read-only memory (ROM), erasable programmable read-only memory (EPROM or flash memory), optical fiber, convenient compact disk read-only memory (CD-ROM), optical storage device, magnetic storage device, or any suitable combination of the above.

In order to provide interaction with users, the systems and techniques described here may be implemented on a computer including a display device (for example, a CRT (cathode ray tube) or LCD (liquid crystal display) monitor) for displaying information to the user, and a keyboard and a pointing device (for example, a mouse or a trackball) through which the user may provide the input to the computer. Other types of devices may also be used to provide interaction with users. For example, a feedback provided to the user may be any form of sensory feedback (for example, visual feedback, auditory feedback, or tactile feedback), and the input from the user may be received in any form (including acoustic input, voice input or tactile input).

The systems and technologies described herein may be implemented in a computing system including back-end components (for example, a data server), or a computing system including middleware components (for example, an application server), or a computing system including front-end components (for example, a user computer having a graphical user interface or web browser through which the user may interact with the implementation of the system and technology described herein), or a computing system including any combination of such back-end components, middleware components or front-end components. The components of the system may be connected to each other by digital data communication (for example, a communication network) in any form or through any medium. Examples of the communication network include a local area network (LAN), a wide area network (WAN), and Internet.

A computer system may include a client and a server. The client and the server are generally far away from each other and usually interact through a communication network. The relationship between the client and the server is generated through computer programs running on the corresponding computers and having a client-server relationship with each other. The server may be a cloud server, also referred to as a cloud computing server or a cloud host, which is a host product in the cloud computing service system to overcome the defect of the traditional physical host and VPS service ("virtual private server", or "VPS"). The defect of the traditional physical host and VPS service is difficult to manage and the business scalability is weak. The server may also be a server of a distributed system or a server combined with a blockchain.

It should be understood that steps of the processes illustrated above may be reordered, added or deleted in various manners. For example, the steps described in the present disclosure may be performed in parallel, sequentially, or in a different order, as long as a desired result of the technical solution of the present disclosure may be achieved. This is not limited in the present disclosure.

The above-mentioned specific embodiments do not constitute a limitation on the scope of protection of the present disclosure. Those skilled in the art should understand that various modifications, combinations, sub-combinations and substitutions may be made according to design requirements and other factors. Any modifications, equivalent replacements and improvements made within the spirit and principles of the present disclosure shall be contained in the scope of protection of the present disclosure.

What is claimed is:

1. A method of configuring a cloud server resource, the method comprising:
    obtaining an operation index of a server instance of an object, wherein the operation index comprises a CPU usage component, a memory usage component and a disk usage component;
    comparing the obtained operation index with a threshold to obtain a combination comparison result, wherein the combination comparison result is obtained by allocating a weight to each operation index component according to a requirement degree of the object to the respective operation index component and performing a weighted summation of a ratio of each operation index component to a respective threshold using a corresponding weight;
    determining whether a configuration of the cloud server resource is to be adjusted, based on the combination comparison result;

responsive to determination that the configuration of the cloud server resource is to be adjusted, presenting to the object a combination adjustment option for adjusting the configuration of the cloud server resource and a cost change corresponding to the combination adjustment option; and adjusting, according to the combination adjustment option, two or more selected from: a number of CPU cores, a memory capacity or a disk capacity of the server instance.

2. The method of claim 1, wherein the threshold comprises at least one threshold for at least one time period.

3. The method of claim 2, wherein the server instance comprises a plurality of server instances; and wherein the obtaining the operation index of the server instance of the object comprises obtaining, for each of the plurality of server instances, at least one operation index for at least one time period.

4. The method of claim 3, wherein the comparing the obtained operation index with a threshold comprises comparing, for each of the plurality of server instances, the obtained operation index with a respective one of the at least one threshold according to the time period.

5. The method of claim 4, wherein:

the at least one time period comprises a first time period and a second time period;

the at least one operation index for at least one time period comprises a CPU usage, a memory usage and a disk usage for the first time period, and a CPU usage, a memory usage and a disk usage for the second time period; and the at least one threshold for at least one time period comprises a threshold of CPU usage, a threshold of memory usage and a threshold of disk usage for the first time period, and a threshold of CPU usage, a threshold of memory usage and a threshold of disk usage for the second time period.

6. The method of claim 5, wherein the comparing, for each of the plurality of server instances, the obtained operation index with respective one of the at least one threshold according to the time period comprises:

comparing the CPU usage, the memory usage and the disk usage for the first time period with the threshold of CPU usage, the threshold of memory usage and the threshold of disk usage for the first time period respectively; and/or comparing the CPU usage, the memory usage and the disk usage for the second time period with the threshold of CPU usage, the threshold of memory usage and the threshold of disk usage for the second time period respectively.

7. An electronic device, comprising:

at least one processor; and a memory, communicatively coupled with the at least one processor, wherein the memory stores instructions executable by the at least one processor, and the instructions, when executed by the at least one processor, are configured to cause the at least one processor to at least:

obtain an operation index of a server instance of an object, wherein the operation index comprises a CPU usage component, a memory usage component and a disk usage component;

compare the obtained operation index with a threshold to obtain a combination comparison result, wherein the combination comparison result is obtained by allocation of a weight to each operation index component according to a requirement degree of the object to the respective operation index component and performance of a weighted summation of a ratio of each operation index component to a respective threshold using a corresponding weight;

determine whether a configuration of the cloud server resource is to be adjusted, based on the combination comparison result;

responsive to determination that the configuration of the cloud server resource is to be adjusted, present to the object a combination adjustment option for adjusting the configuration of the cloud server resource and a cost change corresponding to the combination adjustment option; and cause adjustment, according to the combination adjustment option, two or more selected from: a number of CPU cores, a memory capacity or a disk capacity of the server.

8. The electronic device of claim 7, wherein the threshold comprises at least one threshold for at least one time period.

9. The electronic device of claim 8, wherein the server instance comprises a plurality of server instances; and wherein the instructions are further configured to cause the at least one processor to obtain, for each of the plurality of server instances, at least one operation index for at least one time period.

10. The electronic device of claim 9, the instructions are further configured to cause the at least one processor to compare, for each of the plurality of server instances, the obtained operation index with a respective one of the at least one threshold according to the time period.

11. The electronic device of claim 10, wherein:

the at least one time period comprises a first time period and a second time period;

the at least one operation index for at least one time period comprises a CPU usage, a memory usage and a disk usage for the first time period, and a CPU usage, a memory usage and a disk usage for the second time period; and the at least one threshold for at least one time period comprises a threshold of CPU usage, a threshold of memory usage and a threshold of disk usage for the first time period, and a threshold of CPU usage, a threshold of memory usage and a threshold of disk usage for the second time period.

12. The electronic device of claim 11, wherein the instructions are further configured to cause the at least one processor to:

compare the CPU usage, the memory usage and the disk usage for the first time period with the threshold of CPU usage, the threshold of memory usage and the threshold of disk usage for the first time period respectively; and/or compare the CPU usage, the memory usage and the disk usage for the second time period with the threshold of CPU usage, the threshold of memory usage and the threshold of disk usage for the second time period respectively.

13. A non-transitory computer readable storage medium storing computer instructions, wherein the computer instructions are configured to cause a computer system to at least:

obtain an operation index of a server instance of an object, wherein the operation index comprises a CPU usage component, a memory usage component and a disk usage component;

compare the obtained operation index with a threshold to obtain a combination comparison result, wherein the combination comparison result is obtained by allocation of a weight to each operation index component according to a requirement degree of the object to the respective operation index component and performance of a weighted summation of a ratio of each operation index component to a respective threshold using a corresponding weight;

determine whether a configuration of the cloud server resource is to be adjusted, based on the combination comparison result;

responsive to determination that the configuration of the cloud server resource is to be adjusted, present to the object a combination adjustment option for adjusting the configuration of the cloud server resource and a cost change corresponding to the combination adjustment option; and cause adjustment, according to the combination adjustment option, two or more selected from: a number of CPU cores, a memory capacity or a disk capacity of the server instance.

14. The non-transitory computer readable storage medium of claim 13, wherein the threshold comprises at least one threshold for at least one time period.

15. The non-transitory computer readable storage medium of claim 14, wherein the server instance comprises a plurality of server instances; and wherein the instructions configured to cause the computer system to obtain the operation index of the server instance of the object are further configured to cause the computer system to obtain, for each of the plurality of server instances, at least one operation index for at least one time period.

16. The non-transitory computer readable storage medium of claim 15, wherein the instructions configured to cause the computer system to compare the obtained operation index with a threshold are further configured to cause the computer system to compare, for each of the plurality of server instances, the obtained operation index with a respective one of the at least one threshold according to the time period.

17. The non-transitory computer readable storage medium of claim 16, wherein:

the at least one time period comprises a first time period and a second time period;

the at least one operation index for at least one time period comprises a CPU usage, a memory usage and a disk usage for the first time period, and a CPU usage, a memory usage and a disk usage for the second time period; and the at least one threshold for at least one time period comprises a threshold of CPU usage, a threshold of memory usage and a threshold of disk usage for the first time period, and a threshold of CPU usage, a threshold of memory usage and a threshold of disk usage for the second time period.

18. The non-transitory computer readable storage medium of claim 17, wherein the instructions configured to cause the computer system to compare, for each of the plurality of server instances, the obtained operation index with respective one of the at least one threshold according to the time period are further configured to cause the computer system to:

compare the CPU usage, the memory usage and the disk usage for the first time period with the threshold of CPU usage, the threshold of memory usage and the threshold of disk usage for the first time period respectively; and/or compare the CPU usage, the memory usage and the disk usage for the second time period with the threshold of CPU usage, the threshold of memory usage and the threshold of disk usage for the second time period respectively.

* * * * *